(No Model.) 3 Sheets—Sheet 2.
J. SOLTER.
CAN SOLDERING MACHINE.
No. 554,151. Patented Feb. 4, 1896.
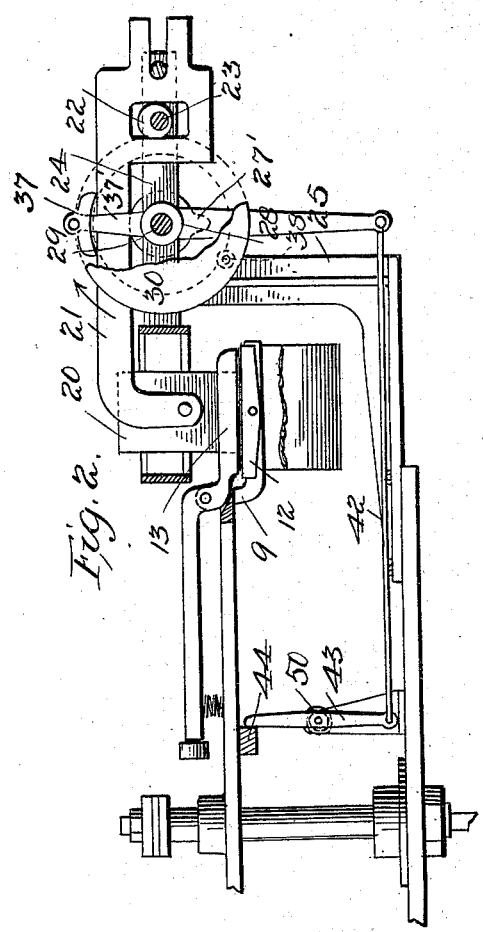
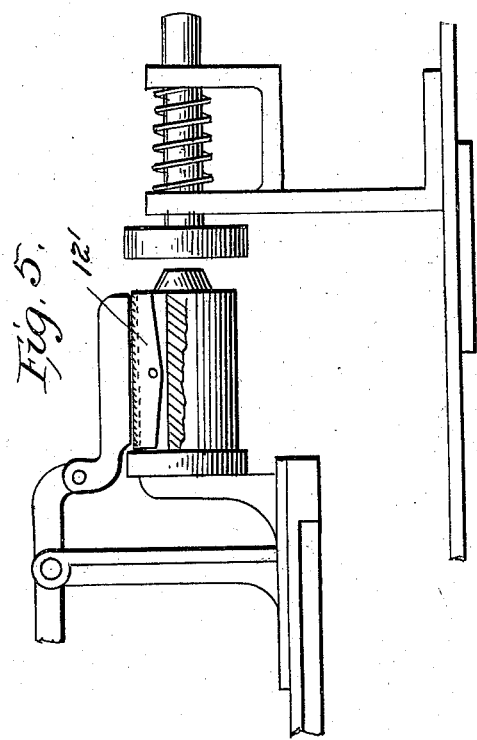
Attest
Walter D Maedsny
F. L. Middleton
Inventor
John Solter
by Ellis Spear
Atty.
ANDREW B.GRAHAM. PHOTO-LITHO. WASHINGTON, D.C.

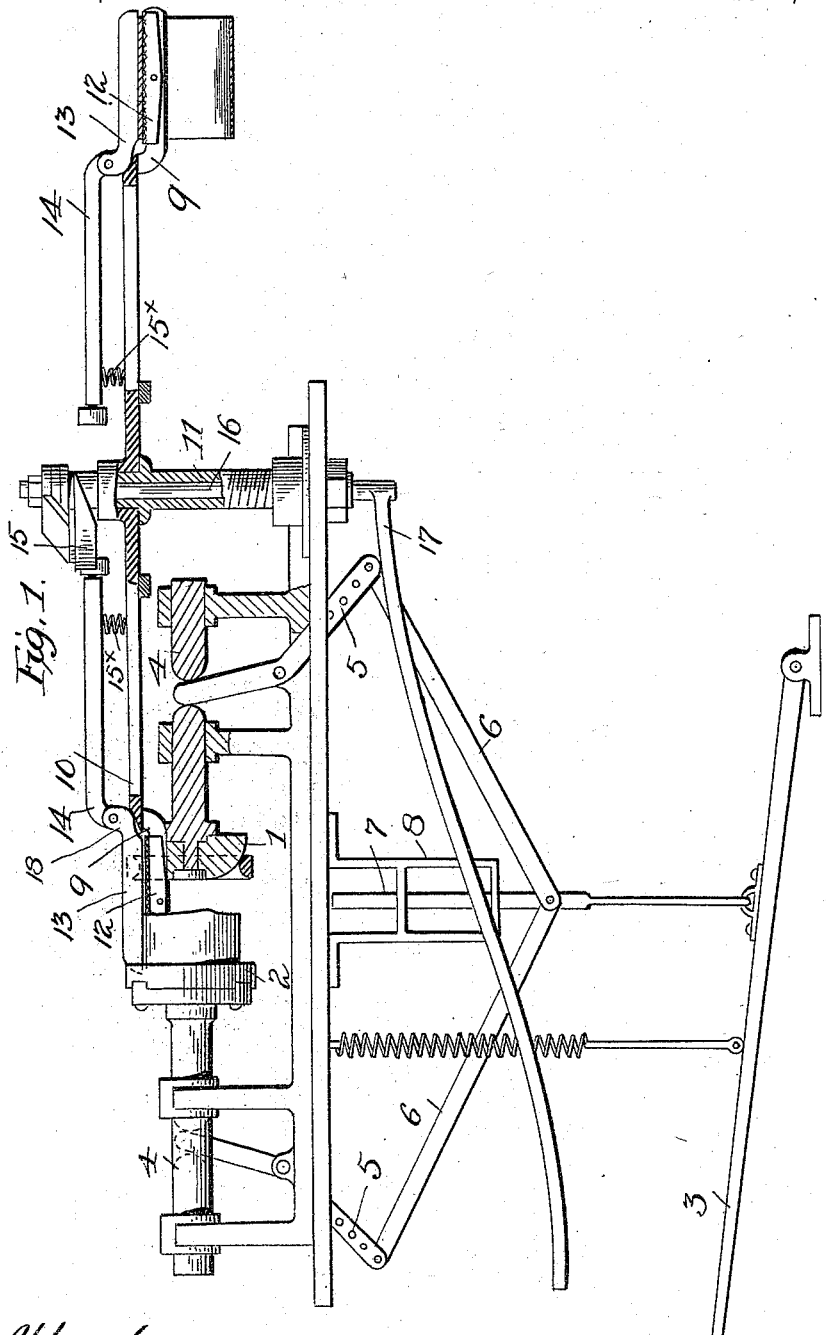

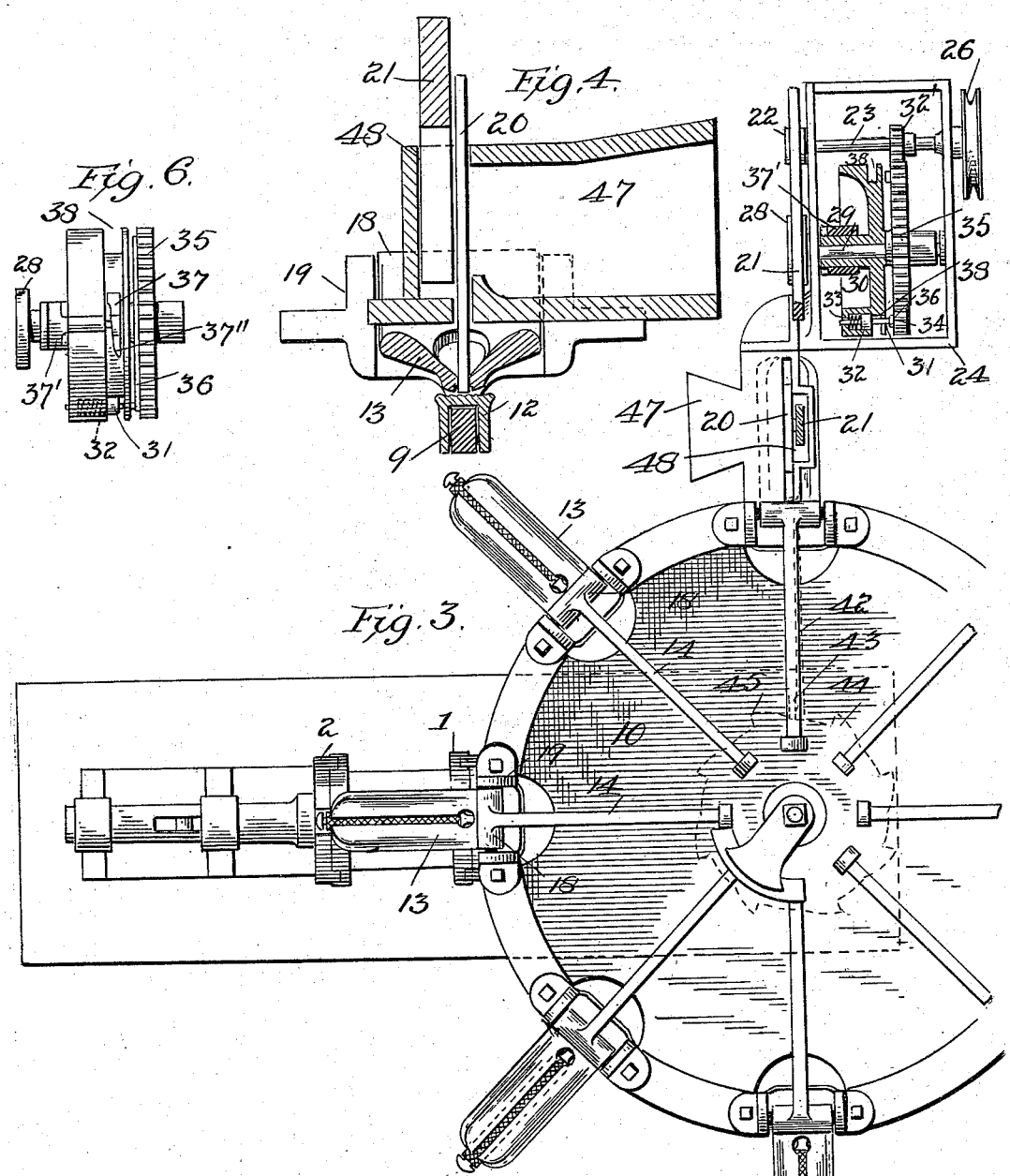

UNITED STATES PATENT OFFICE.

JOHN SOLTER, OF BALTIMORE, MARYLAND, ASSIGNOR OF ONE-HALF TO GEORGE L. KREBS, OF SAME PLACE.

CAN-SOLDERING MACHINE.

SPECIFICATION forming part of Letters Patent No. 554,151, dated February 4, 1896.

Application filed March 13, 1895. Serial No. 541,595. (No model.)

*To all whom it may concern:*

Be it known that I, JOHN SOLTER, a citizen of the United States, residing at Baltimore, in the State of Maryland, have invented certain new and useful Improvements in Can-Soldering Machines, of which the following is a specification, reference being had therein to the accompanying drawings.

My invention is an improvement on the machines of the class shown in my patent of the United States, No. 238,174, granted February 22, 1881, designed especially for gaging the size of the can-body and clamping the same while so gaged for the soldering of the side seam.

My invention includes a special form of horn upon which the gaged can is clamped, whereby the parts will accommodate themselves to any irregularities in the sheet metal, and it includes also an automatic soldering mechanism adapted especially to be applied to the said machine and to other machines of this type, and while I prefer the attachment as combined with the automatically-adjustable form of horn I do not wish to limit myself to this, as will be shown hereinafter.

In the drawings, Figure 1 is a side elevation partly in section. Fig. 2 is a detail side view of the automatic soldering mechanism, the view being taken at quarter-turn from Fig. 1. Fig. 3 is a plan view. Fig. 4 is an end sectional view of the clamps, and Fig. 5 is a modified form of horn. Fig. 6 is a detail view of the automatic clutch mechanism.

The can-body having been previously rolled into cylindrical form is placed by the operator between the gaging-dies 1 2, which have been separated for this purpose by the depression of the foot-lever 3, which is connected with the sliding shafts 4 of the dies by the pivoted levers 5, the links 6 and the vertically-movable bar 7 guided in the bracket 8.

In placing the body to be gaged it is placed with the overlapping edges resting upon the horn 9, extending radially of and slightly depending below the table 10, adapted to revolve on the hollow post 11, there being eight of these horns shown. The dies being released engage the edges of the body and determine accurately the size. The horn has a pivoted bearing-piece 12 upon which the seam rests, so that when the clamp 13 falls upon the body the parts will adapt themselves to any unevenness in the metal. The clamps are carried by pivoted arms 14 and are controlled by the cam-piece 15 on the central post 16, which is turned by the lever 17 to throw the cam-piece away from the roller on the clamp-lever, so that the spring $15^\times$ can throw the clamp into action, all as in the patent referred to, when the operator desires to clamp the gaged body. The clamp consists of two arms, Figs. 3 and 4, having a narrow slot between them, the arms inclining outward and upward from the said slot and adapted to receive solder, which is dropped into place by the attendant or by an automatic device. (Not shown.) The arms extend entirely over and slightly beyond the can, and at their rear ends they are connected to the hub 18 journaled in ears 19 bolted to the table, the lever-arm extending centrally from this hub and carrying the roller at its inner end.

At a quarter-turn from the station at which the gaging is done the automatic soldering devices are arranged. A soldering-iron 20 is pivoted to a reciprocating arm 21 operated constantly by the eccentric 22 on the shaft 23 journaled in the frame 24, supported from the main frame by the bracket 25, Fig. 2. This shaft is driven by a belt and the pulley 26. The iron is fitted to slide between the arms of the clamp and upon the seam to which the solder has been applied; but while the iron is reciprocated constantly it is lowered only periodically—that is, when the clamped body is brought beneath it when the operator moves the carrier-table to place another blank upon the horn for gaging. At other times the arm with the iron is held up out of the plane of the clamps and simply reciprocated without effect. It is held up by the high part 27' of the cam 28 fixed on the shaft 29 journaled in the frame 24. Fixed on this shaft is a disk 30 carrying near its periphery a spring-pawl in the form of a pin 31 having a shoulder 32, upon which the spring 33 bears, forcing the pawl to engage teeth 36 on a rim 34 of a gear-wheel 35 loosely journaled on the shaft 29 and revolved constantly by a pinion 32' on the shaft 23.

When the soldering-iron is to remain up out of contact with the clamped body, the pawl 31 is held up out of engagement with the teeth 36 of the gear by a dog 37 pivoted to a lever 37' and arranged in a groove 38 in the periphery of the disk and to lift the pin by engaging with the shoulder or enlargement thereof as the pin is brought around by the movement of the disk. The dog has an inclined face 37", Fig. 6, up which the shoulder of the pawl rides. The pawl is now out of work. This dog is thrown aside and consequently out of the position in which it holds the pawl lifted by a rod 42 and a lever 43 arranged to be operated by a cam 44 carried under the movable table. The dog in disengaging from the pawl is simply moved circumferentially in the groove 38 a short distance. This is accomplished by a slight swinging movement of the lever 37' on its pivot. The lever 37' is pivoted on the axis of the pawl-disk. This cam, as shown in the plan view, has eight cam-surfaces 45 corresponding to the number of clamps and horns, and each time the table is moved one step one of these cam projections will push outwardly the upper end of the lever 43, which, through the described connections, will throw aside the pivoted dog, allowing the spring-pawl to drop, and this will now engage the teeth of the constantly-moving gear and the disk-shaft and lifting-cam will begin to turn, thus removing the high part of the cam from engaging the soldering-iron holder, and this will now fall into the clamping device which has now been moved beneath it by the movement of the table just mentioned. The iron now makes a number of reciprocations while the operator is placing a new blank upon the horn.

The iron reciprocates between the arms of the clamp, smoothing the solder, the action continuing until the cam has made a complete revolution and lifted the iron-holder up again, at which time the shoulder on the spring-pawl comes against the throw-out dog, which has now been returned to normal position by the spring 50, and then the pawl is lifted from engagement with the teeth of the constantly-rotating gear, and the movement of the pawl-disk and the cam ceases. The iron now is held elevated out of work by the cam, and it will be clear that the iron when set in motion makes a definite number of movements to perform the soldering operation thoroughly and without requiring any particular attention or manipulation on the part of the operator. This insures proper soldering without regard to the aptness and experience of the operator in adjusting the blanks for gaging, for it will be understood that the soldering mechanism performs its work and then goes out of action automatically, and the operator may take more or less time in adjusting the next blank. When this has been done the operator gives the table another step by hand, and in this movement another of the cam-surfaces before mentioned comes against the lever 43 and the dog 37 is withdrawn from the spring-pawl, and through the devices before described the iron is lowered to work upon the solder as the clamped body reaches the soldering-station.

The arms of the clamp are shouldered on their under sides in order to allow the solder to flow properly and prevent tinning of the said arms.

The soldering-iron works through upper and lower slots in a flame-chamber 47 held by the frame, said chamber having a flaring lateral extension in which the flame plays and a slot 48 adapted to allow the arms or holder for the iron to play.

The soldered body can be discharged from the machine by any suitable means—such, for instance, as shown in my prior patent before mentioned.

In Fig. 5 is shown a modified form of horn consisting of a cylinder adapted to receive the body while being gaged. This cylinder is recessed on its upper side, and a bearing-plate 12', similar in arrangement and function to that already described, is pivoted in the recess. This horn is fixed to one of the gaging-dies and is movable with it toward and from the other die. It will thus be seen that I do not wish to limit myself to any particular form of horn, and I wish it also understood that my invention may be applied to other forms of machines besides that shown.

I do not wish to confine myself to the form of carrier shown, as a chain or other suitable carrier may be used; neither do I limit myself to a constantly-reciprocating iron, as it may reciprocate only when lowered to its work.

I claim as my invention—

1. In combination in a soldering-machine, the clamp, the gaging-dies operating lengthwise of the can-body, and the reciprocating soldering-iron with means for operating the same back and forth longitudinally of the seam, substantially as described.

2. In combination the gaging-dies and the horn having a yielding bearing-surface adapted to compensate for irregularities in the metal, substantially as described.

3. In combination, the gaging-dies, the clamp and the horn having a pivoted bearing-piece, substantially as described.

4. In combination, in a soldering-machine, the horn or support, the clamp, the reciprocating soldering-iron and the yielding bearing-piece carried by the horn, substantially as described.

5. In combination in a soldering-machine, the horns, the carrier therefor, the reciprocating soldering-iron, the cam for raising and lowering the same, the clutch for controlling the cam and the connections from the moving carrier for controlling the clutch, substantially as described.

6. In combination in a soldering-machine, the carrier, the supports or rests for the can-bodies, the iron reciprocating longitudinally of the seam and means including a clutch for operating the same arranged to throw the same into its reciprocating action on the blank automatically when the blank has reached the soldering-station and to throw the iron out of action after it has performed its work, substantially as described.

7. In combination in a soldering-machine, the carrier, the support for the can-bodies and the soldering-iron with operating means therefor including a throw-in and throw-out device and connections therefrom to the movable carrier for controlling the said device, substantially as described.

8. In combination in a soldering-machine, the carrier, the supports for the can-bodies, the soldering-iron and operating mechanism therefor including a clutch and the throw-out dog, with operating connections therefor arranged to move the clutch out of operation when the same has completed one movement, substantially as described.

9. In combination in a soldering-machine, the carrier, the supports for the can-bodies, gages operating on the ends of the can the soldering-iron, means for reciprocating the same longitudinally of the seam and means for lifting the iron out of work and placing the same in action, substantially as described.

10. In combination in a soldering-machine, the carrier, the supports for the can-bodies, gages operating on the ends of the can the soldering-iron, means for reciprocating the same and means for lifting the same out of action after a predetermined period of reciprocation, substantially as described.

11. In combination in a soldering-machine, the carrier, the supports for the can-bodies, the soldering-iron, means for reciprocating the same, means for lifting the same out of action and placing it in action and the controlling device with connections to the carrier for operating the same.

12. In combination in a soldering-machine, the carrier, the supports for the can-bodies, the soldering-iron means for reciprocating the same, the lifting-cam, the pawl-carrier or disk connected thereto, the constantly-operating gear or clutch wheel and the dog controlling the pawl having connections for operating the same periodically, substantially as described.

13. In combination, the carrier, the supports for the can-bodies, the soldering-iron, the bar holding the same, the eccentric for operating the bar, the lifting-cam and the clutch for operating the same with means for throwing the clutch into and out of operation.

14. In combination the carrier, the supports for the can-bodies, the soldering-iron, the reciprocating bar carrying the same, the eccentric for moving the bar, the lifting-cam, the pawl-disk, the shaft therefor, the clutch-gear on the shaft, the pinion on the eccentric shaft meshing therewith and the dog for controlling the pawl with means for operating the same.

In testimony whereof I affix my signature in presence of two witnesses.

JOHN SOLTER.

Witnesses:
HENRY E. COOPER,
WALTER DONALDSON.